(12) United States Patent
Tobita et al.

(10) Patent No.: US 7,442,735 B2
(45) Date of Patent: Oct. 28, 2008

(54) NUCLEATING AGENT COMPOSITION AND CRYSTALLINE POLYMER COMPOSITIONS CONTAINING THE SAME

(75) Inventors: Etsuo Tobita, Saitama (JP); Kazukiyo Nomura, Saitama (JP); Naoshi Kawamoto, Saitama (JP)

(73) Assignee: Asahi Denka Co., Ltd., Tokyo (JP)

( * ) Notice: Subject to any disclaimer, the term of this patent is extended or adjusted under 35 U.S.C. 154(b) by 260 days.

(21) Appl. No.: 10/566,684

(22) PCT Filed: Jul. 30, 2004

(86) PCT No.: PCT/JP2004/011326

§ 371 (c)(1), (2), (4) Date: Aug. 11, 2006

(87) PCT Pub. No.: WO2005/012413

PCT Pub. Date: Feb. 10, 2005

(65) Prior Publication Data

US 2007/0054996 A1    Mar. 8, 2007

(30) Foreign Application Priority Data

Aug. 1, 2003    (JP) .............................. 2003-285474

(51) Int. Cl.
*C08K 5/00*    (2006.01)
(52) U.S. Cl. .................... 524/108; 524/394; 524/399
(58) Field of Classification Search ............... 524/108, 524/394, 399
See application file for complete search history.

(56) References Cited

U.S. PATENT DOCUMENTS 6,319,991 B1 * 11/2001 Okayama et al. ............. 525/240

FOREIGN PATENT DOCUMENTS

| JP | 9-104790 A | 4/1997 |
|---|---|---|
| JP | 2001-81236 A | 3/2001 |
| JP | 2002-332383 A | 11/2002 |
| JP | 2002-338820 A | 11/2002 |

* cited by examiner

*Primary Examiner*—Peter D Mulcahy
(74) *Attorney, Agent, or Firm*—Millen, White, Zelano, Branigan, P.C.

(57) ABSTRACT

A crystal nucleating agent composition comprising 100 mass parts of a crystal nucleating agent compound represented by the following general formula (I), -50 mass parts of a lithium salt of an organic fatty acid represented by the following general formula (II), and 5-50 mass parts of a metal salt of an organic fatty acid represented by the following general formula (III):

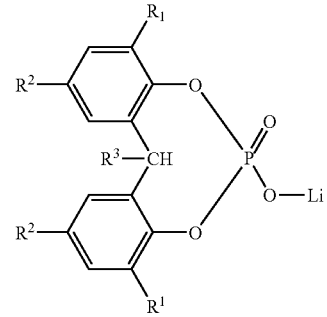

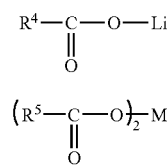

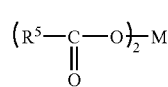

(in the formula $R^1$ and $R^2$ are alkyl groups having 1-4 carbon atoms, $R^3$ is a hydrogen atom or an alkyl group having 1-4 carbon atoms, $R^4$, $R^5$ are groups derived from an organic fatty acid having 10-30 carbon atoms, and M is a divalent metal atom).

5 Claims, No Drawings

NUCLEATING AGENT COMPOSITION AND CRYSTALLINE POLYMER COMPOSITIONS CONTAINING THE SAME

FIELD OF THE INVENTION

This invention relates to a crystal nucleating agent composition and crystalline polymer composition containing same, and more specifically, to a crystal nucleating agent composition formed from a specific composition, and crystalline polymer composition containing same.

BACKGROUND ART

Crystalline polymers, e.g. polyolefin polymers such as polyethylene, polypropylene and polybutene-1, and polyester polymers such as polyethylene terephthalate, and polyamide polymers have a slow rate of crystallization after heat forming. Consequently, the molding cycle when they are processed is too long, and as crystallization proceeds even after molding was complete, the molded product sometimes deformed. In addition, there was the disadvantage that these crystalline polymer compound materials formed large spherocrystals, so their mechanical strength and transparency was poor.

These disadvantages are due to the crystalline properties of the crystalline polymer compounds, and are known to be overcome by forming fine crystals very rapidly. Now, to produce fine crystals very rapidly, the crystallization temperature may be increased, or crystal nucleating agents and crystallization promoters may be added.

As the nucleating agent or crystallization promoter, metal salts of cyclic phosphates such as 2,2'-methylene bis(4,6-ditert-butylphenyl)phosphate are used. Japanese Patent Application Laid-Open H5-43746 and Japanese Patent Application Laid-Open 2002-338820 disclose that good results are obtained by the concurrent use of these metal salts of cyclic phosphoric acid esters and metal salts of organic fatty acids. However, there are problems because the prior art crystal nucleating agent compositions had poor miscibility with and/or dispersibility in the crystalline polymers, so they did not impart sufficient transparency when they were used.

SUMMARY OF THE INVENTION

It is therefore an object of the invention to provide a crystal nucleating agent composition which imparts sufficient transparency, and a crystalline polymer composition containing this crystal nucleating agent composition.

After intensive studies, the inventors discovered that a special composition comprising a lithium salt of a cyclic phosphoric acid ester, a lithium salt of an organic fatty acid and a divalent metal salt of an organic fatty acid, could resolve the aforesaid problems, and thereby arrived at the present invention.

In other words, the first invention provides a crystal nucleating agent composition comprising 100 mass parts of a crystal nucleating agent compound represented by the following general formula (I), 5-50 mass parts of a lithium salt of an organic fatty acid represented by the following general formula (II), and 5-50 mass parts of a metal salt of an organic fatty acid represented by the following general formula (III):

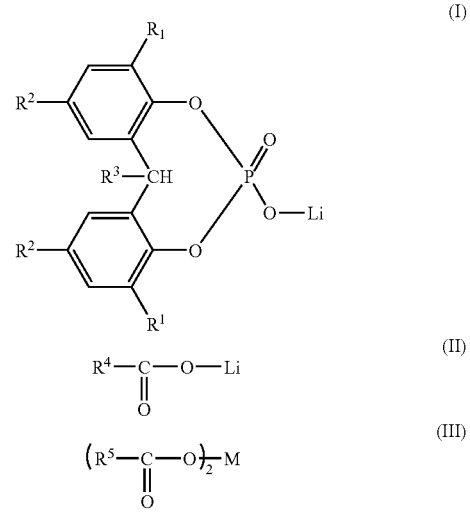

(in the formula $R^1$, $R^2$ are alkyl groups having 1-4 carbon atoms, $R^3$ is a hydrogen atom or an alkyl group having 1-4 carbon atoms, $R^4$, $R^5$ are groups derived from an organic fatty acid having 10-30 carbon atoms, and M is a divalent metal atom).

The second invention provides the first crystal nucleating agent composition of the invention wherein, in the aforesaid general formula (III), the metal atom represented by M is an alkaline earth metal or zinc.

The third invention provides the first or second crystal nucleating agent composition of the invention, which is manufactured by giving a crushing treatment which imparts a shear force to a blended mixture comprising a crystal nucleating agent compound, a lithium salt of an organic fatty acid and a metal salt of an organic fatty acid.

The fourth invention provides a crystalline polymer composition formed by containing one of the crystal nucleating agent compositions of the first-third inventions in a crystalline polymer.

The fifth invention provides the fourth crystalline polymer composition of the invention, wherein the crystalline polymer is a polyolefin polymer.

THE BEST EMBODIMENT OF THE INVENTION

The invention will now be described in more detail referring to specific embodiments.

The crystal nucleating composition of the invention comprises a crystal nucleating agent compound represented by the aforesaid general formula (I), a lithium salt of an organic fatty acid represented by the aforesaid general formula (II), and a metal salt of an organic fatty acid represented by the aforesaid general formula (III), wherein the blending proportion of the lithium salt of the organic fatty acid is 5-50 mass parts but preferably 10-30 mass parts, and the blending proportion of the metal salt of the organic fatty acid is 5-50 mass parts but preferably 10-30 mass parts, relative to 100 mass parts of the crystal nucleating compound represented by the general formula (I).

In the general formula (I) of the invention, the alkyl group having 1-4 carbon atoms may be methyl, ethyl, propyl, isopropyl, butyl, isobutyl, sec-butyl and tert-butyl. The two $R^1$ may be identical or different, and the two $R^2$ may be identical or different. The alkyl group having 1-4 carbon atoms represented by $R^3$ may be for example the groups mentioned for $R^2$, and among these alkyl groups, methyl is preferred. $R^3$ is most preferably a hydrogen atom.

Specific examples of the crystal nucleating agent compound represented by the aforesaid general formula (I), are the following compounds No.1-No.6.

Compound 1
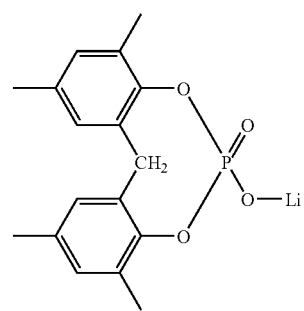

Compound 2
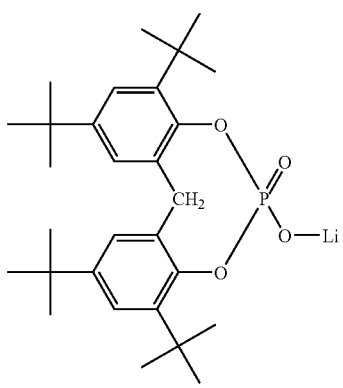

Compound 3
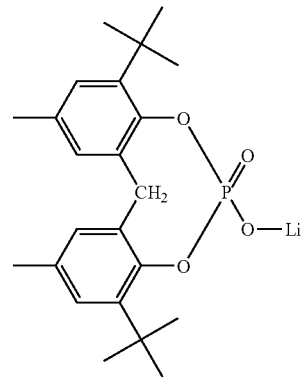

Compound 4
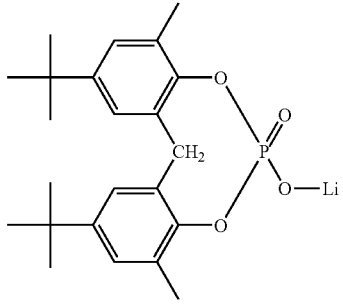

Compound 5
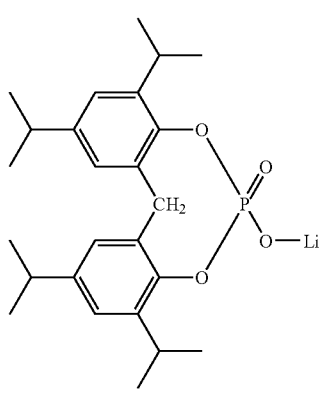

Compound 6
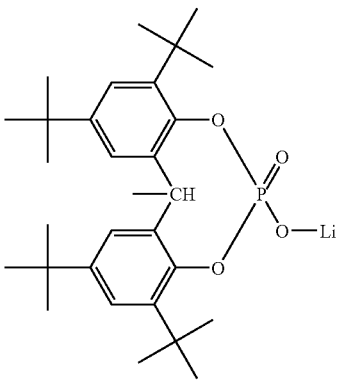

Among the aforesaid crystal nucleating agent compounds, compound No. 2 is able to impart the best transparency to the crystalline polymer composition, and is therefore preferred.

In the lithium organic fatty acid represented by the general formula (II) of the invention, $R^4$ is a group introduced from an organic fatty acid having 10-30 carbon atoms. This organic fatty acid may have a hydroxyl group, examples thereof being capric acid, neodecanoic acid, undecanoic acid, lauric acid, tridecanoic acid, myristic acid, pentadecanoic acid, palmitic acid, margaric acid, stearic acid, nonadecanoic acid, arachidic acid, behenic acid, lignoceric acid, cerotic acid, montanoic acid, melissic acid, obtusilic acid, linderic acid, tsuzuic acid, palmitoleic acid, petroselinic acid, oleic acid, elaidic acid, vaccenic acid, linolic acid, linoelaidic acid, γ-linolenic acid, linolenic acid, recinoleic acid, 12-hydroxystearic acid, naphthenic acid and abietic acid. In particular, since stearic acid and 12-hydroxystearic acid have a remarkable effect with low cost, they are preferred.

In the metal salt of an organic fatty acid represented by the general formula (III) according to the invention, $R^5$ is a group introduced from an organic fatty acid having 10-30 carbon atoms such as the groups mentioned for $R^4$. Examples of a divalent metal atom represented by M are magnesium, calcium, strontium, barium, iron, nickel, cobalt, lead and zinc. In particular, since an alkaline earth metal and zinc are low cost, they are preferred, and magnesium, calcium and zinc are more preferred.

The crystal nucleating composition of this invention may be obtained by simply mixing the aforesaid ingredients, but to make the lithium salt of the organic fatty acid and/or metal salt of the organic fatty acid adhere to the particle surface of the crystal nucleating compound by a topochemical or mechanochemical effect, the mixture of the aforesaid ingredients may be given a crushing treatment which imparts a shear force such as by a mortar, agitation mill, ball mill, vibration ball mill, roller mill, rod mill, tube mill, conical mill, high swing ball mill, pin type mill, hammer mill, knife hammer mill, attrition mill, jet mill, counter jet mill, spiral jet mill, jetomizer, micronizer, nanomizer, majac mill, micro atomizer, micron mill, rotary cutter, impact crushing type mill or compression shearing die mill. Alternatively, the lithium salt of the organic fatty acid and/or metal salt of the organic fatty acid can be melted by heat, or the crystallization method, impregnation method or spray coat method may be used, a solution obtained by dissolving and/or dispersing it in water or an organic solvent can be made to adhere to the particle surface of the crystal nucleating compound by a mixer, colloid mill, premier colloid mill or Charlotte colloid mill, or the lithium salt of the organic fatty acid and/or metal salt of the organic fatty acid can be vaporized, or chemical vapor deposition may be used wherein the lithium salt of the organic fatty acid and/or metal salt of the organic fatty acid is vaporized, and made to adhere or deposited on the surface of the crystal nucleating compound.

The aforesaid manufacturing methods may be used alone, or two or more may be used together. A crushing treatment which imparts a shear force enhances the transparency effect which is a doping effect of the crystal nucleating composition of the invention at low cost, and is therefore preferred.

Examples of a crushing apparatus for performing the crushing treatment which imparts a shear force are "ATTRITER" and "FINE MILL", manufactured by Mitsui Mining Co., Ltd.; "PLANETARY BALL MILL" and "COJET SYSTEM α-mkIII" manufactured by Seishin Co., Ltd.; "SUPER MICRON MILL", "INOMIZER", "COUNTER JET MILL" and "MECHANOFUSION" manufactured by Hosokawa Micron Co., Ltd.; "KOLLOPLEX" and "EXCEED MILL" manufactured by Makino Sangyo Ltd.; and "HEIKO SAMPLE MILL™ TI-500ET" manufactured by Heiko Seisakusho.

The crystal nucleating composition of the invention is not particularly limited by particle state such as particle diameter and particle size distribution, and the particle state obtained by the aforesaid manufacturing methods may be used. It is known that if the crystal nucleating component has fine particles, dispersibility in the crystalline polymer improves, so the average particle diameter is preferably 5 μm or less, and more preferably 1 μm or less. If a crushing treatment which imparts a shearing force, which is a preferred form of the invention, is performed, very fine particles can be obtained.

The particle diameter of the crystal nucleating composition is preferably of the same order as the particle diameter of the nucleating agent.

The crystalline polymer composition of this invention contains the aforesaid crystal nucleating composition in a crystalline polymer, and the molded product thus obtained has an improved degree of transparency and/or strength. This crystalline polymer composition may further contain other additive ingredients if required.

Examples of the aforesaid crystalline polymer are polyolefin polymers including α-olefin polymers such as low density polyethylene, linear low density polyethylene, high density polyethylene, ultra-high molecular weight polyethylene, isotactic polypropylene, syndiotactic polypropylene, hemiisotactic polypropylene, polybutene-1, poly-3-methyl-1-butene, poly-3-methyl-1-pentene and poly-4-methyl-1-pentene, and α-olefin copolymers such as ethylene/propylene block or random copolymers; thermoplastic straight-chain polyester polymers such as polyethylene terephthalate, polybutylene terephthalate and polyhexamethylene terephthalate; polysulfide polymers such as polyphenylene sulfide; polylactic acid polymers such as polycaprolactone; straight-chain polyamide polymers such as polyhexamethylene adipamide; crystalline polystyrene polymers such as syndiotactic polystyrene, polyacetal, liquid crystal polyester or polyamide, polyvinylidene chloride, polyvinyl acetate, polyether ether ketone and fluororesin.

Among the aforesaid crystalline polymers, a polyolefin polymer is preferred due to its remarkable effect in the crystal nucleating composition of the invention, and polypropylene, ethylene/propylene block or random copolymer, block or random copolymers of α-olefins other than ethylene, and polypropylene resins such as mixtures of these propylene polymers with other α-olefin polymers, are particularly preferred.

The aforesaid crystalline polymer is not particularly limited according to manufacturing process or physical properties, e.g., polypropylene resins which are particularly suitable can be used regardless of their limiting viscosity, isotactic pentad molar fraction, density, molecular weight distribution, melt flow rate or rigidity, and the polypropylene resins described in for example JP-A 63-37148, JP-A 63-37152, JP-A 63-90552, JP-A 63-210152, JP-A 63-213547, JP-A 63-243150, JP-A 63-243152, JP-A 63-260943, JP-A 63-260944, JP-A 63-264650, JP-A H01-178541, JP-A H02-49047, JP-A H02-102242, JP-A H02-251548, JP-A H02-279746 and JP-A H03-195751 can also be used.

In the crystalline polymer composition of this invention, the content of the crystal nucleating composition is not particularly limited. Regarding this content, if the amount of the compound represented by the general formula (I) is less than 0.005 mass parts relative to 100 mass parts of the crystalline polymer, it may not demonstrate sufficient addition effect, and if it exceeds 10 mass parts, not only does cost increase without obtaining a further improvement in the addition effect, but the physical properties of the polymer products obtained may be affected. Therefore, 0.005 to 10 mass parts is preferred, and 0.01 to 2.5 mass parts is more preferred.

If required, other additive ingredients known in the art may be used, e.g., a hindered amine light stabilizer (HALS), ultraviolet absorber, phenol, sulfur or phosphorus type antioxidant, or an alkali metal salt of an organic acid. Examples of a HALS are the compound represented by the following general formula (IV), a cyanuric chloride condensation compound and a polymer type compound.

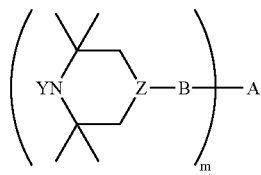

(IV)

(in the formula, m is an integer from 1-6, A is a hydrogen atom or a hydrocarbon group of valency m having 1-18 carbon atoms, an acyl group of valency m or a carbamoyl group of valency m, B is an oxygen atom, —NH— or NRe— with an alkyl group Re having 1-8 carbon atoms, Y is a hydrogen atom, an oxygen radical (.O), alkoxy group having 1-18 carbon atoms, alkyl group having 1-8 carbon atoms or hydroxyl, and Z is a methane or a group (V) with an alkyl group Rf having 1-8 carbon atoms.

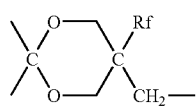

(V)

In the aforesaid general formula (IV), the hydrocarbon group of valency m having 1-18 carbon atoms may be a group (alkyl group, alkane diyl or hexayl) derived from methane, ethane, propane, butane, sec-butane, tert-butane, isobutane, pentane, isopentane, tert-pentane, hexane, cyclohexane, heptane, isoheptane, tert-heptane, n-octane, isooctane, tert-octane, 2-ethyl hexane, nonane, isononane, decane, dodecane, tridecane, tetradecane, pentadecane, hexadecane, heptadecane or octadecane.

The acyl group of valency m in the aforesaid A is a group derived from a carboxylic acid, a carboxylic acid with basicity m, and a (n-m) alkyl ester of a carboxylic acid with basicity n having m remaining carboxyl groups (referred to as acyl derivative compounds).

Examples of this acyl derivative compound are acetic acid, benzoic acid, 4-trifluoro methyl benzoic acid, salicylic acid, acrylic acid, methacrylic acid, oxalic acid, malonic acid, succinic acid, glutaric acid, adipic acid, pimelic acid, suberic acid, azelaic acid, sebacic acid, dodecane diacid, 2-methyl succinic acid, 2-methyl adipic acid, 3-methyl adipic acid, 3-methyl pentane diacid, 2-methyl octanedioic acid, 3,8-dimethyl decanedioic acid, 3,7-dimethyl decanedioic acid, hydrated dimer acid, dimer acid, phthalic acid, terephthalic acid, isophthalic acid, naphthalene dicarboxylic acid, cyclohexane dicarboxylic acid, trimellitic acid, trimesic acid, propane-1,2,3-tricarboxylic acid, propane-1,2,3-tricarboxylic acid mono- or dialkyl ester, pentane-1,3,5-tricarboxylic acid, pentane-1,3,5-tricarboxylic acid mono or dialkyl ester, butane-1,2,3,4-tetracarboxylic acid, butane-1,2,3,4-tetra carboxylic acid mono, di or trialkyl ester, pentane-1,2,3,4,5-pentacarboxylic acid, pentane-1,2,3,4,5-pentacarboxylic acid mono, di, tri or tetra-alkyl ester, hexane-1,2,3,4,5,6-hexacarboxylic acid, and hexane-1,2,3,4,5,6-hexacarboxylic acid mono, di, tri, tetra or penta-alkyl ester.

The carbamoyl group of valency m in the aforesaid A is a mono-alkyl carbamoyl group or a dialkyl carbamoyl group derived from an isocyanate compound.

Examples of an isocyanate compound from which a monoalkyl carbamoyl group is derived are tolylene diisocyanate, diphenyl methane-4,4'-diisocyanate, p-phenylene diisocyanate, xylylene diisocyanate, 1,5-naphthylene diisocyanate, 3,3'-dimethyl diphenyl-4,4'-diisocyanate, dianisidine diisocyanate, tetra-methyl xylylene diisocyanate, isophorone diisocyanate, dicyclohexyl methane-4,4'-diisocyanate, trans-1,4-cyclohexyl diisocyanate, norbornene diisocyanate, 1,6-hexamethylene diisocyanate, 2,2,4(2,4,4)-trimethyl hexamethylene diisocyanate, lysine diisocyanate, triphenyl methane triisocyanate, 1-methyl benzol-2,4,6-triisocyanate, and dimethyl triphenylmethane tetra-isocyanate. Examples of a dialkyl carbamoyl group are diethyl carbamoyl, dibutyl carbamoyl, dihexyl carbamoyl, and dioctyl carbamoyl group.

The group represented by these A may be replaced by a halogen atom, a hydroxyl group, an alkyl group, an alkoxy group, a nitro group or a cyano group.

The alkyl group having 1-8 carbon atoms represented by Re which is substituted by N in B of formula (IV) may be methyl, ethyl, propyl, isopropyl, butyl, sec-butyl, tert-butyl, isobutyl, amyl, isoamyl, tert-amyl, hexyl, cyclohexyl, heptyl, isoheptyl, tert-heptyl, 1-ethyl pentyl, n-octyl, isooctyl, tert-octyl or 2-ethyl hexyl.

Y of equation (IV) is a hydrogen atom, an oxy radical (.O), an alkoxy group having 1-18 carbon atoms, an alkyl group having 1-8 carbon atoms, or hydroxyl.

Examples of an alkoxy group having 1-18 carbon atoms are methoxy, ethoxy, propoxy, isopropoxy, butoxy, sec-butyloxy, tert-butyloxy, isobutyloxy, amyloxy, isoamyloxy, hexyloxy, heptyloxy, octyloxy, 2-ethyhexyloxy, nonyloxy, isononyloxy, decyloxy, dodecyloxy, trisyloxy, tetradecyloxy, pentadecyloxy, hexadecyloxy, heptadecyloxy and octadecyloxy. Examples of an alkyl group having 1-8 carbon atoms are identical groups to those mentioned for Re, and the alkyl group having 1-8 carbon atoms represented by Rf in Z of equation (VI) may be identical to those mentioned for Re.

Further examples of a HAL represented by the aforesaid general formula (IV) are 2,2,6,6-tetramethyl-4-piperidyl stearate, 1,2,2,6,6-pentamethyl-4-piperidyl stearate, 2,2,6,6-tetra-methyl-4-piperidylbenzoate, bis(2,2,6,6-tetramethyl-4-piperidyl)sebacate, bis (1,2,2,6,6-pentamethyl-4-piperidyl) sebacate, bis(1-octoxy-2,2,6,6-tetramethyl-4-piperidyl) sebacate, 1,2,2,6,6-pentamethyl-4-piperidylmethacrylate, 2,2,6,6-tetramethyl-piperidylmethacrylate, tetrakis(2,2,6,6-tetramethyl-4-piperidyl)-1,2,3,4-butane tetracarboxylate, tetrakis(2,2,6,6-pentamethyl-4-piperidyl)-1,2,3,4-butane tetracarboxylate, bis(2,2,6,6-tetramethyl-4-piperidyl), bis(tridecyl)-1,2,3,4-butane tetracarboxylate, bis(1,2,2,6,6-pentamethyl-4-piperidyl), bis (tridecyl)-1,2,3,4-butane tetracarboxylate, bis(1,2,2,6,6-pentamethyl-4-piperidyl)-2-butyl-2-(3,5-ditert-butyl-4-hydroxybenzyl)malonate, 3,9-bis (1,1-dimethyl-2-(tris(2,2,6,6-tetramethyl-4-piperidyloxycarbonyloxy)butyl carbonyloxy)ethyl)-2,4,8,10-tetraoxaspiro[5.5]undecane, and 3,9-bis(1,1-dimethyl-2-(tris(1,2,2,6,6-pentamethyl-4-piperidyloxycarbonyloxy)butyl carbonyloxy)ethyl)-2,4,8,10-tetraoxaspiro[5.5]undecane.

Examples of a cyanuric chloride condensation type HALS are 1,6-bis (2,2,6,6-tetramethyl-4-piperidylamino)hexane/2,4-dichloro-6-morpholino-s-triazine polycondensate, 1,6-bis (2,2,6,6-tetramethyl-4-piperidylamino)hexane/2,4-dichloro-6-tert-octylamino-s-triazine polycondensate, 1,5,8,12-tetrakis [2,4-bis (N-butyl-N-(2,2,6,6-tetramethyl-4-piperidyl) amino)-s-triazine-6-yl]-1,5,8,12-tetra-azadodecane, 1,5,8,12-tetrakis[2,4-bis(N-butyl-N-(1,2,2,6,6-pentamethyl-4-piperidyl)amino)-s-triazine-6-yl]-1,5,8,12-tetra-azadodecane, 1,6,11-tris[2,4-bis(N-butyl-N-(2,2,6,6-tetramethyl-4-piperidyl)amino)-s-triazine-6-ylamino]undecane, and 1,6,11-tris[2,4-bis(N-butyl-N-(1,2,2,6,6-pentamethyl-4-piperidyl)amino)-s-triazine-6-ylamino]undecane.

Examples of a polymer type are 1-(2-hydroxyethyl)-2,2,6,6-tetra-methyl-4-piperidinole/diethyl succinate polycondensate, and 1,6-bis(2,2,6,6-tetra-methyl-4-piperidylamino)hexane/dibromoethane polycondensate.

Examples of an ultraviolet absorber are 2-hydroxybenzophenones such as 2,4-dihydroxybenzophenone, 2-hydroxy-4-methoxybenzophenone, 2-hydroxy-4-octoxybenzophenone, and 5,5'-methylene bis(2-hydroxy-4-methoxybenzophenone); 2-(2-hydroxyphenyl) benzotriazoles such as 2-(2-hydroxymethylphenyl) benzotriazole, 2-(2-hydroxy-5-tert-octyl phenyl) benzotriazole, 2-(2-hydroxy-3,5-ditert-butylphenyl)-5-chloro benzotriazole, 2-(2-hydroxy-3-tert-5-methylphenyl)-5-chloro benzotriazole, 2-(2-hydroxy-3,5-dicumyl phenyl) benzotriazole, 2,2'-methylene bis(4-tert-octyl-6-benzotriazolyl phenol), polyethylene glycol ester of 2-(2-hydroxy-3-tert-butyl-5-carboxyphenyl)benzotriazole, 2-[2-hydroxy-3-(2-acryloyloxyethyl)-5-methylphenyl]

benzotriazole, 2-[2-hydroxy-3-(2-methacryloyloxyethyl)-5-tert-butylphenyl]benzotriazole, 2-[2-hydroxy-3-(2-methacryloyloxyethyl)-5-tert-octyl phenyl]benzotriazole, 2-[2-hydroxy-3-(2-methacryloyloxyethyl)-5-tert-butylphenyl]-5-chlorobenzotriazole, 2-[2-hydroxy-5-(2-methacryloyloxyethyl)phenyl]benzotriazole, 2-[2-hydroxy-3-tert-butyl-5-(2-methacryloyloxy-ethyl)phenyl]benzotriazole, 2-[2-hydroxy-3-tert-amyl-5-(2-methacryloyl oxyethyl)phenyl]benzotriazole, 2-[2-hydroxy-3-tert-butyl-5-(3-methacryloyloxypropyl)phenyl]-5-chlorobenzotriazole, 2-[2-hydroxy-4-(2-methacryloyloxymethyl)phenyl]benzotriazole, 2-[2-hydroxy-4-(3-methacryloyloxy-2-hydroxypropyl)phenyl]benzotriazole, and 2-[2-hydroxy-4-(3-methacryloyloxypropyl)phenyl]benzotriazole; 2-(2-hydroxyphenyl-4,6-diaryl-1,3,5-triazines such as 2-(2-hydroxy-4-methoxy phenyl)-4,6-diphenyl-1,3,5-triazine, 2-(2-hydroxy-4-hexyloxyphenyl)-4,6-diphenyl-1,3,5-triazine, 2-(2-hydroxy-4-octoxyphenyl)-4,6-bis(2,4-dimethylphenyl)-1,3,5-triazine, 2-[2-hydroxy-4-(3-C12-C13 mixed alkoxy-2-hydroxy propoxy)phenyl]-4,6-bis (2,4-dimethylphenyl)-1,3,5-triazine, 2-[2-hydroxy-4-(2-acryloyloxyethoxy)phenyl]-4,6-bis(4-methylphenyl)-1,3,5-triazine, 2-(2,4-dihydroxy-3-allyl phenyl)-4,6-bis(2,4-dimethylphenyl)-1,3,5-triazine, and 2,4,6-tris(2-hydroxy-3-methyl-4-hexyloxyphenyl)-1,3,5-triazine; benzoates such as phenyl salicylate, resorcinol monobenzoate, 2,4-ditert-butylphenyl-3,5-ditert-butyl-4-hydroxybenzoate, octyl(3,5-ditert-butyl-4-hydroxy)benzoate, dodecyl(3,5-ditert-butyl-4-hydroxy)benzoate, tetradecyl(3,5-ditert-butyl-4-hydroxy)benzoate, hexadecyl(3,5-ditert-butyl-4-hydroxy)benzoate, octadecyl(3,5-ditert-butyl-4-hydroxy)benzoate, and behenyl(3,5-ditert-butyl-4-hydroxy)benzoate; tert-butyl-of 5-di 4-hydroxy)benzoate; substituted oxanilides such as 2-ethyl-2'-ethoxy oxanilide, and 2-ethoxy-4'-dodecyl oxanilide; cyanoacrylates such as ethyl-α-cyano-β,β-diphenyl acrylate and methyl-2-cyano-3-methyl-3-(p-methoxyphenyl)acrylate; and metal salts or metal chelates, especially those of nickel or chromium.

Examples of a phosphorus anti-oxidant are triphenyl phosphite, tris(2,4-di-tert-butylphenyl)phosphite, tris(2,5-di-tert-butylphenyl)phosphite, tris(nonylphenyl)phosphite, tris(di-nonylphenyl)phosphite, tris(mono, di mixed nonylphenyl) phosphite, diphenyl acid phosphite, 2,2'-methylene bis (4,6-di-tert-butylphenyl)octylphosphite, diphenyldecyl phosphite, diphenyloctyl phosphite, di(nonylphenyl)pentaerythritol diphosphite, phenyldiisodecyl phosphite, tributyl phosphite, tris(2-ethyhexyl)phosphite, tridecyl phosphite, trilauryl phosphite, dibutyl acid phosphite, dilaurylacidophosphite, trilauryltrithiophosphite, bis(neopentyl glycol)-1,4-cyclohexane dimethyl diphosphite, bis(2,4-di-tert-butylphenyl)pentaerythritol diphosphite, bis(2,5-di-tert-butylphenyl)pentaerythritol diphosphite, bis (2,6-di-tert-butyl-4-methylphenyl)pentaerythritol diphosphite, bis(2,4-dicumylphenyl)pentaerythritol diphosphite, distearyl pentaerythritol diphosphite, tetra(C12-15 mixed alkyl)-4,4'-isopropylidene diphenyl phosphite, bis[2,2'-methylene bis(4,6-diamylphenyl)]isopropylidene diphenyl phosphite, tetratridecyl-4,4'-butylidene bis(2-tert-butyl-5-methylphenol) diphosphite, hexa(tridecyl)-1,1,3-tris(2-methyl-5-tert-butyl-4-hydroxyphenyl)butane-triphosphite, tetrakis(2,4-di-tert-butylphenyl)biphenylene diphosphonite, tris(2-[(2,4,7,9-tetrakis tert-butyl dibenzo[d, f][1,3,2]dioxaphosphepine-6-yl)oxy]ethyl)amine, 9,10-dihydro-9-oxa-10-phosphaphenanthrene-10-oxide, and 2-butyl-2-ethyl propanediol-2,4,6-tri-tert-butylphenol monophosphite.

Examples of a phenol anti-oxidant are 2,6-di-tert-butyl-p-cresole, 2,6-diphenyl-4-octadecyloxyphenol, stearyl(3,5-di-tert-butyl-4-hydroxy phenyl)propionate, distearyl(3,5-dibutyl-4-hydroxybenzyl)phosphonate, tridecyl-3,5-di-tert-butyl-4-hydroxybenzyl thioacetate, thiodiethylene bis [(3,5-di-tert-butyl-4-hydroxyphenyl)propionate], 4,4'-thiobis(6-tert-butyl-m-cresol), 2-octylthio-4,6-di (3,5-di-tert-butyl-4-hydroxyphenoxy)-s-triazine, 2,2'-methylene bis(4-methyl-6-tert-butylphenol), bis[3,3-bis (4-hydroxy-3-tert-butylphenyl) butyric acid]glycol ester, 4,4'-butylidene bis(2,6-di-tert-butylphenol), 4,4'-butylidene bis(6-di-tert-butyl-3-methylphenol), 2,2'-ethylidene bis(4,6-di-tert-butyl phenol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl]terephthalate, 1,3,5-tris(2,6-dimethyl-3-hydroxy-4-tert-butyl benzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethyl benzene, 1,3,5-tris[(3,5-di-tert-butyl-4-hydroxyphenyl)propionyloxy ethyl] isocyanurate, tetrakis[methylene-3-(3',5'-di-tert-butyl-4'-hydroxyphenyl)propionate]methane, 2-tert-butyl-4-methyl-6-(2-acryloyloxy-3-tert-butyl-5-methylbenzyl)phenol, 3,9-bis[2-(3-tert-butyl-4-hydroxy-5-methylhydrocinnamoyloxy)-1,1-dimethylethyl]-2,4,8,10-tetraoxaspiro[5.5]undecane, and triethylene glycol bis[β-(3-tert-butyl-4-hydroxy-5-methylphenyl)propionate.

Examples of a sulfur anti-oxidant are dilauryl thiodipropionate and dialkyl thiodipropionates of dimyristyl, myristyl-stearyl and distearyl esters, and (β-alkyl mercaptopropionic acid esters of polyols such as pentaerythritol tetra(β-dodecyl mercaptopropionate).

Examples of the aforesaid alkali metal salts of organic acids are sodium, lithium and potassium salts of the organic acids mentioned as precursors of the aforesaid ingredients (II) or (III), and aromatic acids or cycloaliphatic acids such as benzoic acids, hydroxybenzoic acids in various substituent positions, methylbenzoic acids in various substituent positions, and tert-butyl benzoic acids in various substituent positions.

One of the aforesaid additives may be used alone, or a mixture of two or more may be used together. Regarding the respective amounts, sufficient effect may not be obtained if the addition amount is less than 0.001 mass parts relative to 100 mass parts of crystalline polymer, and if the addition amount exceeds 10 mass parts, not only is there no further increase in the effect of the additive but cost also increases, so 0.001-10 mass parts is preferred.

The crystalline polymer composition of present invention may, if required, further contain an antistatic agent such as a cationic surfactant, anionic surfactant, non-ionic surfactant or amphoteric surfactant; a flame retardant such as a halogen compound, phosphorus ester compound, phosphorus amide compound, melamine compound, melamine salt compound of polyphosphoric acid, fluororesin or metal salt; lubricating agents which belong to a hydrocarbon, fatty acid, aliphatic alcohol, aliphatic ester, aliphatic amide or metal soap; various heavy metal inactivating agents; hydrotalcite; organic carboxylic acids; colorants such as dyes and pigments; processing aids such as polyolefin powders; silicic acid type inorganic additives such as fumed silica, silica fine particles, silica rock, diatomaceous earths, clay, kaolin, diatomaceous earth, silica gel, calcium silicate, sericite, kaolinite, flint, feldspar powder, vermiculite, attapulgite, talc, mica, minnesotite, pyrophyllite or silica; fillers such as glass fibre and calcium carbonate; and sorbitol clarifying agents such as bis(dibenzylidene)sorbitol.

These additives, which may be used if required, can be added separately from the crystalline nucleating agent composition of present invention, or by mixing with the crystalline nucleating agent composition and then adding the mixture to the crystalline polymer, or by first mixing in a desired proportion with a binder, wax, solvent or a granulating agent such as silica used which may be used as required to form granules of a one-pack complex additive.

The crystalline polymer composition of present invention may be used for automobile resin parts such as bumpers, dashboards and instrument panels; resin parts of domestic electrical appliances such as refrigerators, washing machines and vacuum cleaners; domestic goods such as kitchen utensils, buckets and bath products; resin parts of connectors and the like; storage vessels such as tanks and bottles; medical molded products such as medical packs, liquid transportation packs, hypodermic syringes, syringe parts, catheters and medical tubes; construction materials such as walls, flooring, window frames and wallpaper; electrical wire cladding; industrial materials for houses and tunnels; molded products including films and sheets for food packaging materials and the like, e.g. wrappings and trays; and fibres.

EXAMPLES

Hereafter, the invention will be described in further detail referring to manufacturing examples, examples and comparative examples. However, the invention is not to be construed as being limited in anyway by the following examples.

Manufacturing Example 1

The crystal nucleating compounds having the blending proportions in TABLES 1-2 were crushed together using a roller mill grinder (manufactured by HEIKO SEISAKUSYO; SAMPLE MILL : Commercial Name) at a system temperature of 30° C. for 1 hour, and crystal nucleating compositions No.1-No. 10 were thereby obtained.

TABLE 1

| Crystal nucleating agent composition | Crystal nucleating agent compound (mass parts) | Organic fatty acid lithium (mass parts) | Organic fatty acid metal salt (mass parts) |
|---|---|---|---|
| No. 1 | Compound No. 2 (100) | Lithium stearate (25) | Magnesium stearate (25) |
| No. 2 | Compound No. 2 (100) | Lithium stearate (25) | Calcium stearate (25) |
| No. 3 | Compound No. 2 (100) | Lithium stearate (25) | Zinc stearate (25) |
| No. 4 | Compound No. 2 (100) | Lithium stearate (25) | Calcium 12-hydroxystearate (25) |
| No. 5 | Compound No. 2 (100) | Lithium stearate (25) | Calcium myristate (25) |

TABLE 2

| Crystal nucleating agent composition | Crystal nucleating agent compound (mass parts) | Organic fatty acid lithium (mass parts) | Organic fatty acid metal salt (mass parts) |
|---|---|---|---|
| No. 6 | Compound No. 2 (100) | Lithium 12-hydroxystearate (25) | Magnesium stearate (25) |
| No. 7 | Compound No. 2 (100) | Lithium 12-hydroxystearate (25) | Calcium stearate (25) |
| No. 8 | Compound No. 2 (100) | Lithium 12-hydroxystearate (25) | Zinc stearate (25) |
| No. 9 | Compound No. 2 (100) | Lithium 12-hydroxystearate (25) | Calcium 12-hydroxystearate (25) |
| No. 10 | Compound No. 2 (100) | Lithium 12-hydroxystearate (25) | Calcium myristate (25) |

Manufacturing Comparative Example

The crystal nucleating compounds having the blending proportions shown in TABLE 3 were mixed by an identical method to that of Manufacturing Example 1, and crushed to obtain the comparison nucleating agent compositions No.1-No.4.

TABLE 3

| Nucleating agent composition for comparison | Crystal nucleating agent compound (mass parts) | Organic fatty acid metal salt (mass parts) | Organic fatty acid metal salt (mass parts) |
|---|---|---|---|
| No. 1 | Compound No. 2 (100) | — | — |
| No. 2 | Compound No. 2 (100) | — | Magnesium stearate (50) |
| No. 3 | Compound No. 2 (100) | Lithium stearate (50) | — |
| No. 4 | Compound No. 2 (100) | Potassium stearate (25) | Calcium 12-hydroxystearate (25) |

Example 1

100 mass parts of a random copolymer of ethylene/propylene=3/97 having a melt index of 10 g/10 minutes at 230° C., 2.16 kg (polymerization catalyst: Ziegler-Natta catalyst, number average molecular weight: $9.5 \times 10^4$: mass average molecular weight: $5.8 \times 10^5$), 0.1 mass parts of a phenolic antioxidant: tetrakis[methylene-3-(3',5'-di-tert-butyl-4'-hydroxyphenyl)propionate]methane, 0.1 mass parts of a phosphorus type antioxidant: tris(2,4-di-tert-butylphenyl)phosphite, 0.1 mass parts of calcium stearate, and the crystalline nucleating agent compositions of TABLE 1 were mixed in a Henschel mixer at 1100 rpm for 5 minutes, and pellets were formed by extruding at 250° C., 25 rpm. The product was injection molded at 250° C. to obtain test pieces of thickness 1 mm, and the haze value (JIS K7105) was evaluated. TABLE 4 shows the results.

Example 2

Test pieces were manufactured from the crystal nucleating agent compositions shown in TABLE 2 in an identical way to that of Example 1, and evaluated. TABLE 5 shows the results.

Comparative Examples 1-5

Test pieces were manufactured from mixtures not using the crystal nucleating agent composition (Comparative Example 1), and mixtures wherein the crystal nucleating agent compositions were replaced by comparison nucleating agent compositions (Comparative Examples 2-5), and evaluated. TABLE 6 shows the results.

TABLE 4

| No. | Crystal nucleating agent composition (mass parts) | Haze (%) |
|---|---|---|
| Example 1-1 | Crystal nucleating agent composition No. 1 (0.2) | 14.5 |
| Example 1-2 | Crystal nucleating agent composition No. 2 (0.2) | 15.0 |
| Example 1-3 | Crystal nucleating agent composition No. 3 (0.2) | 15.0 |
| Example 1-4 | Crystal nucleating agent composition No. 4 (0.2) | 14.7 |
| Example 1-5 | Crystal nucleating agent composition No. 5 (0.2) | 14.7 |

TABLE 5

| No. | Crystal nucleating agent composition (mass parts) | Haze (%) |
|---|---|---|
| Example 2-1 | Crystal nucleating agent composition No. 6 (0.2) | 14.1 |
| Example 2-2 | Crystal nucleating agent composition No. 7 (0.2) | 13.8 |
| Example 2-3 | Crystal nucleating agent composition No. 8 (0.2) | 14.5 |
| Example 2-4 | Crystal nucleating agent composition No. 9 (0.2) | 14.2 |
| Example 2-5 | Crystal nucleating agent composition No. 10 (0.2) | 14.0 |

TABLE 6

| No. | Crystal nucleating agent element (mass parts) | Haze (%) |
|---|---|---|
| Comparative example 1 | — | 37.8 |
| Comparative example 2 | Comparison composition No. 1 (0.13) | 19.7 |
| Comparative example 3 | Comparison composition No. 2 (0.2) | 16.0 |
| Comparative example 4 | Comparison composition No. 3 (0.2) | 18.2 |
| Comparative example 5 | Comparison composition No. 4 (0.2) | 16.5 |

Manufacturing Example 2

Crystal nucleating agent compositions No.1, No.2, No.7 and No.9 obtained in the aforesaid Manufacturing Example 1, were further 1 pass (i.e., single pass) crushed using a jet mill crusher (Cojet System system α-mkIII : Commercial Name manufactured by SEISHIN Co.) under the conditions of P NOZZLE PRESSURE: 0.75 MPa, G NOZZLE PRESSURE: 0.60 MPa and feeder: 60 g/hour, and crystal nucleating compositions No.1', No.2', No.7' and No.9' were thereby obtained.

Example 3

Test pieces were manufactured from the crystal nucleating agent compositions shown in TABLE 7 in an identical way to that of Example 1, and evaluated. TABLE 7 shows the results.

TABLE 7

| No. | Crystal nucleating agent composition (mass parts) | Haze (%) |
|---|---|---|
| Example 3-1 | Crystal nucleating agent composition No. 1' (0.2) | 13.2 |
| Example 3-2 | Crystal nucleating agent composition No. 2' (0.2) | 13.9 |
| Example 3-3 | Crystal nucleating agent composition No. 7' (0.2) | 12.8 |
| Example 3-4 | Crystal nucleating agent composition No. 9' (0.2) | 13.2 |

INDUSTRIAL APPLICABILITY

This invention can provide a crystal nucleating agent composition which has sufficient addition effect as regards transparency, and a crystalline polymer composition containing this crystal nucleating composition.

What is claimed is:

1. A crystal nucleating agent composition comprising 100 mass parts of a crystal nucleating agent compound represented by the following general formula (I), 5-50 mass parts of a lithium salt of an organic fatty acid represented by the following general formula (II), and 5-50 mass parts of a metal salt of an organic fatty acid represented by the following general formula (III):

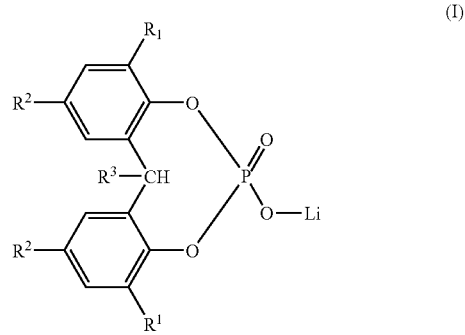

(I)

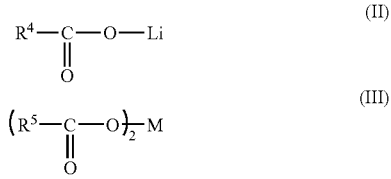

(II)

(III)

(in the formula $R^1$ and $R^2$ are alkyl groups having 1-4 carbon atoms, $R^3$ is a hydrogen atom or an alkyl group having 1-4 carbon atoms, $R^4$, $R^5$ are groups derived from an organic fatty acid having 10-30 carbon atoms, and M is a divalent metal atom).

2. The crystal nucleating agent composition according to claim 1, wherein the metal atom represented by M in said general formula (III) is an alkaline earth metal or zinc.

3. The crystal nucleating agent composition according to claim 1, manufactured by performing a crushing treatment which imparts a shear force to a blended mixture of the crystal nucleating agent compound, a lithium organic fatty acid and a metal salt of an organic fatty acid.

4. A crystalline polymer composition wherein any of the crystal nucleating agent compositions according to claim 1 is contained in a crystalline polymer.

5. The crystalline polymer composition according to claim 4, wherein the crystalline polymer is a polyolefin polymer.

* * * * *